United States Patent [19]

Rehrig

[11] 4,273,346
[45] Jun. 16, 1981

[54] OVER-THE-COUNTER CART WITH HINGEDLY ATTACHED PLASTIC BASKET AND RETRACTING FRONT GATE

[76] Inventor: Houston Rehrig, 1401 S. Oak Knoll Ave., Pasadena, Calif. 91109

[21] Appl. No.: 18,028

[22] Filed: Mar. 6, 1979

[51] Int. Cl.³ .............................................. B62B 3/08
[52] U.S. Cl. .............................. 280/33.99 F; 220/73; 280/33.99 H; 292/300; 296/57 R
[58] Field of Search ................... 280/33.99 R, 33.99 F, 280/33.99 H, 33.99 B, 79.2, DIG. 4; 220/73, 74; 292/300; 296/57 R

[56] References Cited

U.S. PATENT DOCUMENTS

| | | | |
|---|---|---|---|
| 2,813,725 | 11/1957 | Hoedinghaus et al. | 280/33.99 B |
| 3,052,319 | 9/1962 | Swanson | 186/1 AC |
| 3,190,673 | 6/1965 | Olander et al. | 280/33.99 H |
| 3,297,108 | 1/1967 | Davis | 280/33.99 F X |
| 3,353,836 | 11/1967 | Davis | 280/33.99 S |
| 3,361,438 | 1/1968 | Davis | 280/33.99 R |
| 3,375,018 | 3/1968 | Close | 280/33.99 R |
| 3,517,773 | 1/1970 | Swanson | 186/1 AC |
| 3,999,774 | 12/1976 | Rehrig | 280/33.99 R |
| 4,116,456 | 9/1978 | Stover et al. | 280/33.99 B |
| 4,118,044 | 10/1978 | Celms | 280/33.99 F |

FOREIGN PATENT DOCUMENTS 112920 1/1969 Denmark ......................... 280/33.99 H Primary Examiner—David M. Mitchell
Assistant Examiner—D. W. Underwood

[57] ABSTRACT

An over-the-counter cart utilizing separate rear and front baskets and having a wheeled metal frame. The front basket is made of plastic wherein the side panels, the bottom panel and the front panel, having an opening, are integrally molded of open lattice work construction. A metal unitary bar extends along the open perimeter of the plastic basket and along a portion of the underside of its bottom panel adjacent its rear edge. Separate metal hinge bars, on each side of the plastic basket, are attached to the unitary bar and extend along a portion of the underside of the plastic basket; the free ends of these bars are received within a hinge tube, mounted on the cart frame, to allow the basket's rotation from a horizontal position to a vertical position to allow nesting of the carts. A hingedly attached child seat and seat back panel are incorporated into the rear basket.

In order to accommodate a computer checkout scanner system, a front gate is hingedly attached to the plastic basket to close the opening in the front panel. Channels fitted with guides in the underside of the bottom panel allow the front gate to be lowered, upon opening, and then retracted to a position remote from the front panel to prevent obstructing the scanner. Consequently, goods can be removed easily and directly from the basket through the opening in the front panel and be passed over the scanner.

38 Claims, 21 Drawing Figures

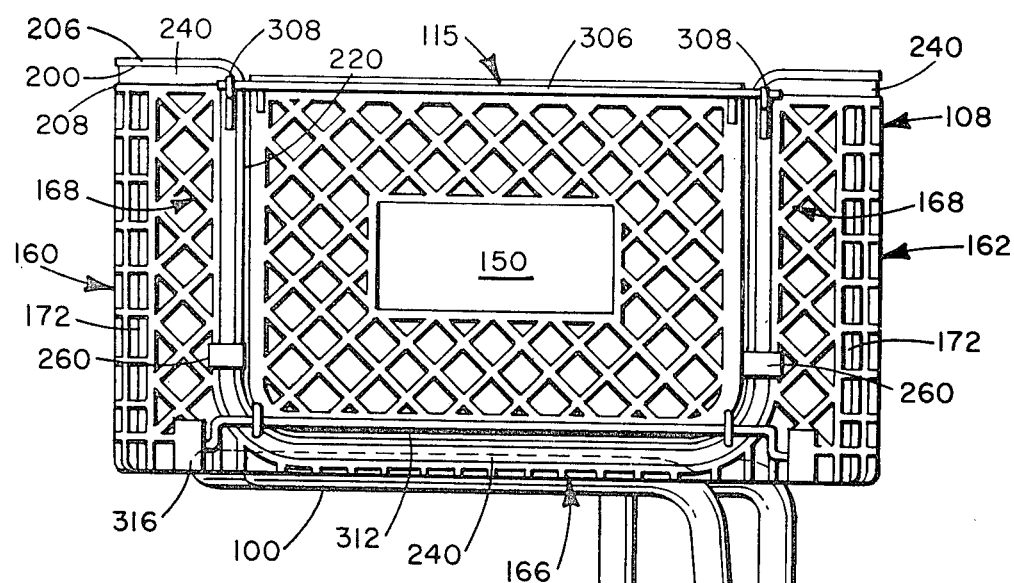
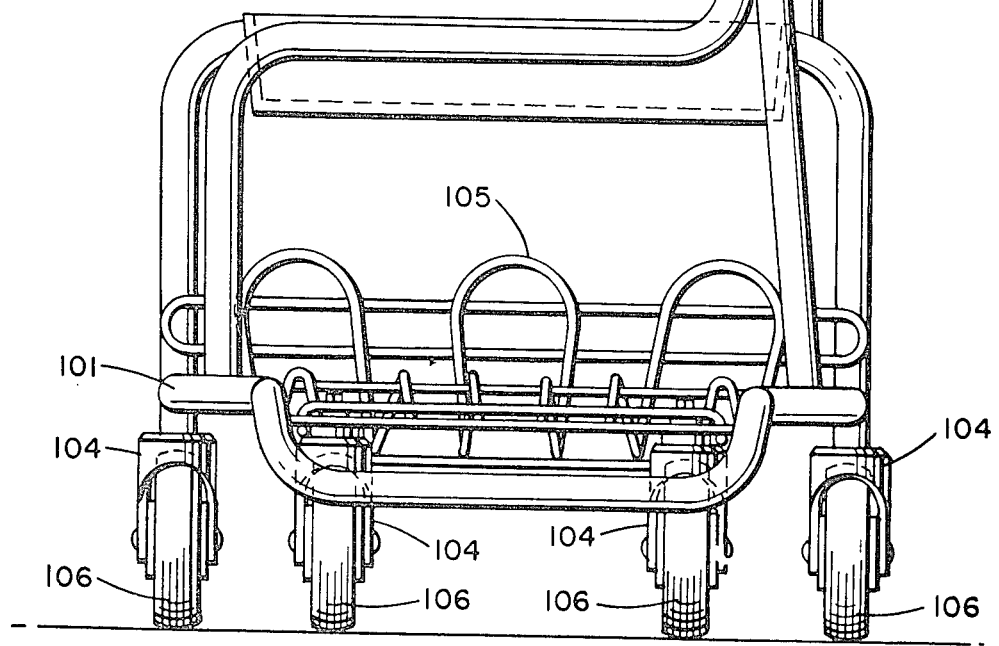
FIG. 2

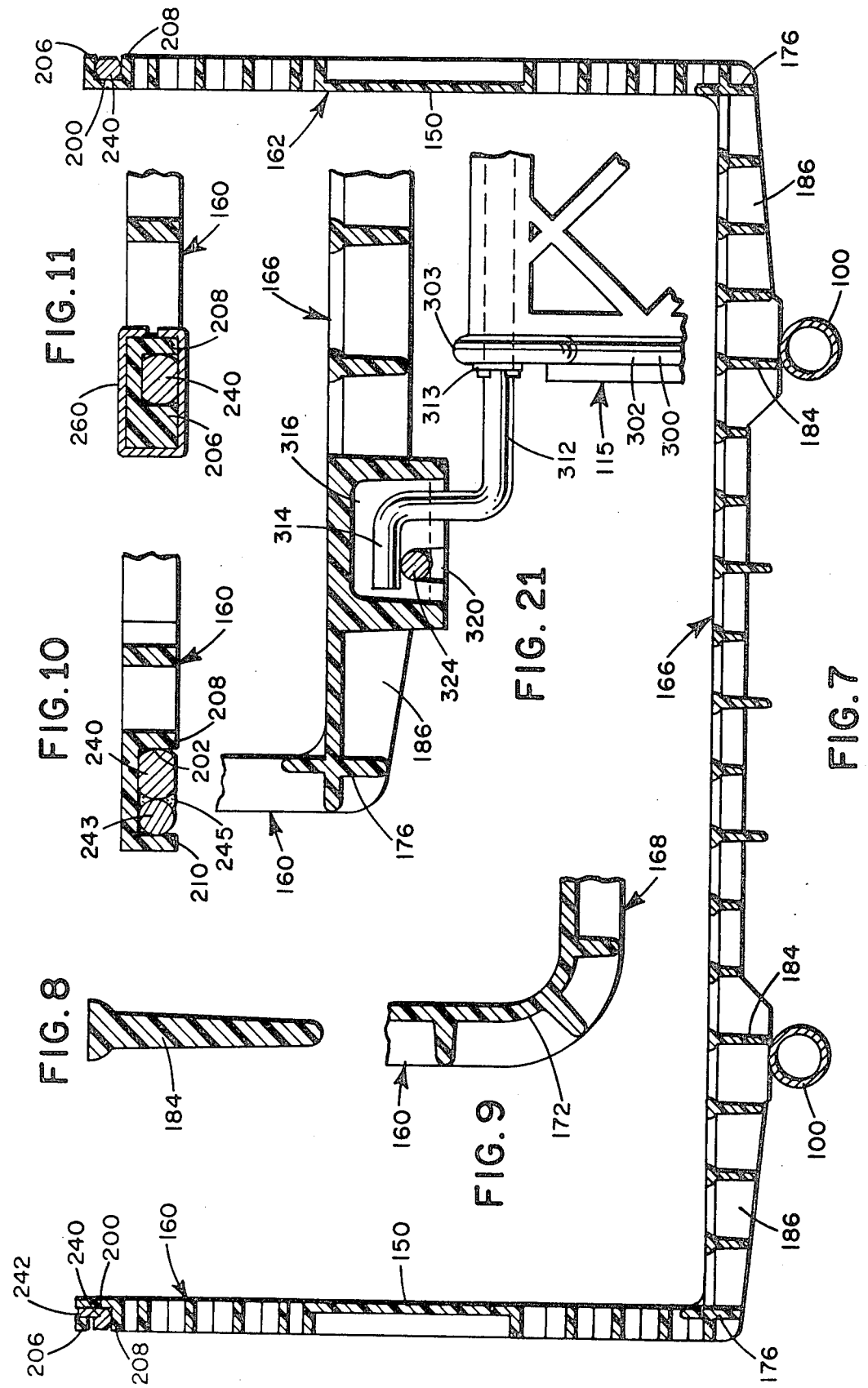

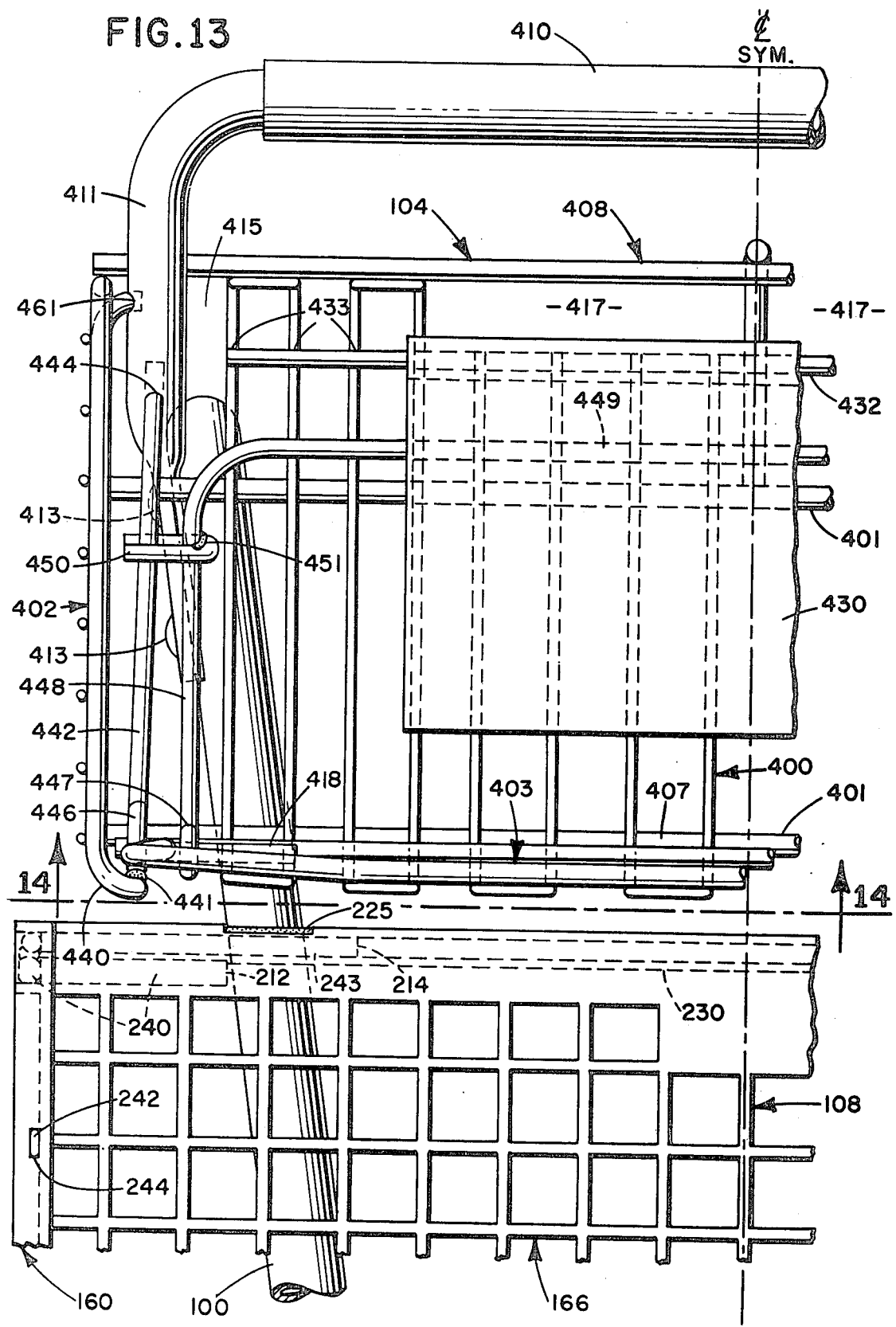

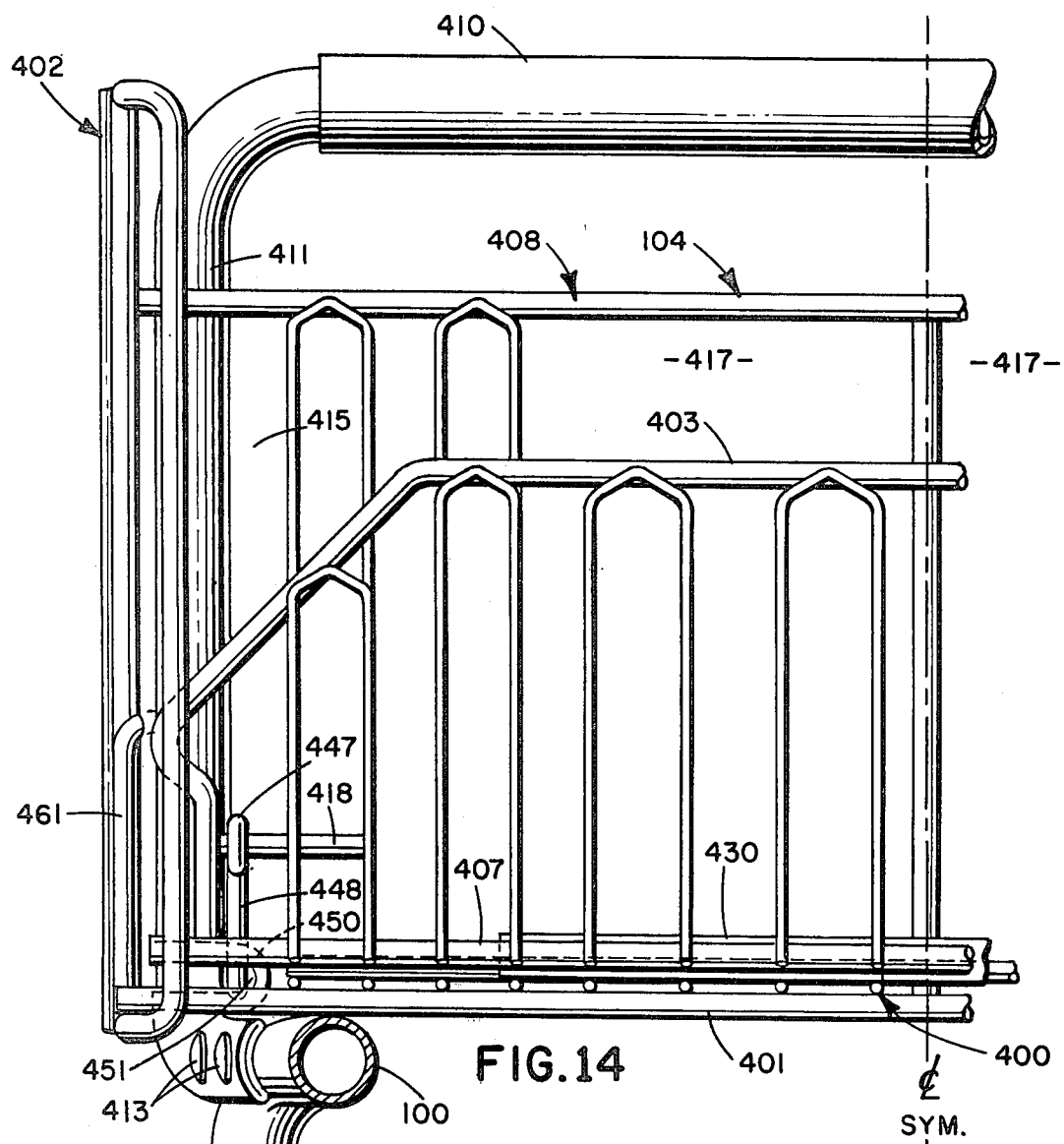
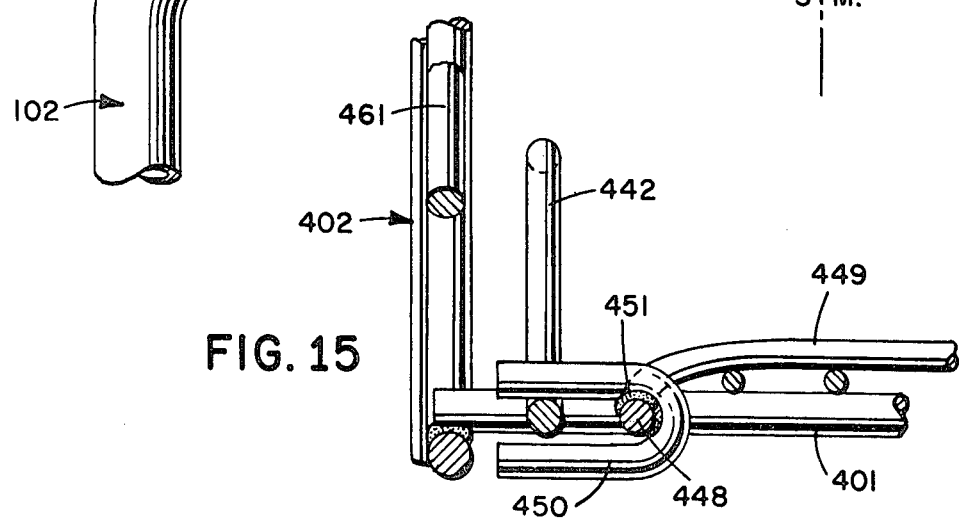

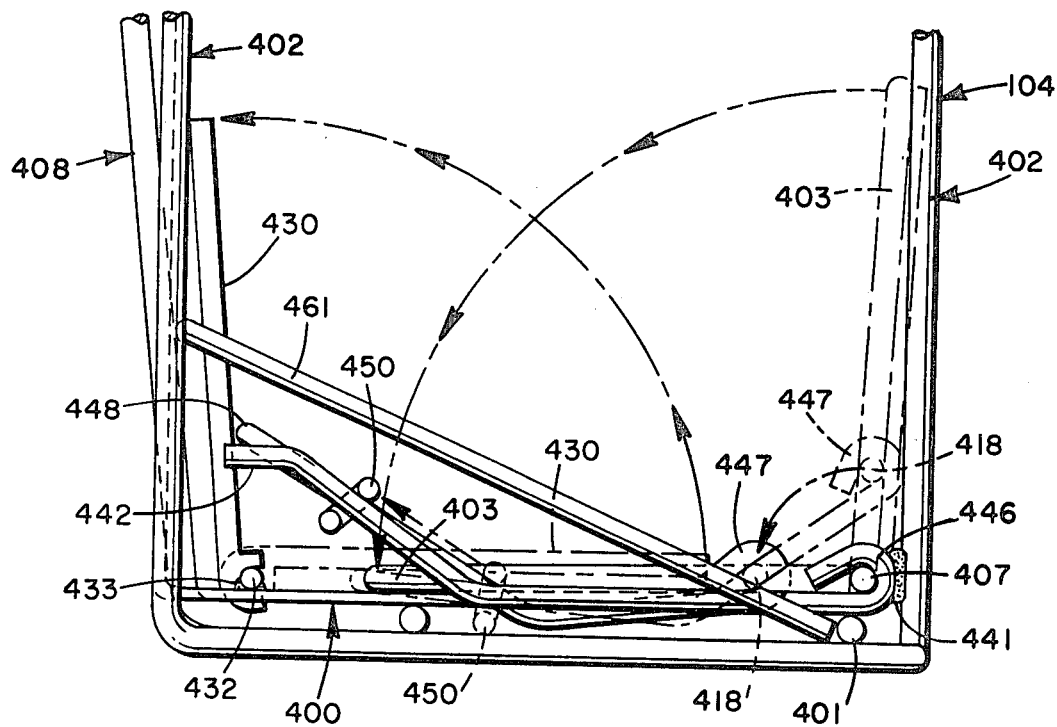
FIG. 16
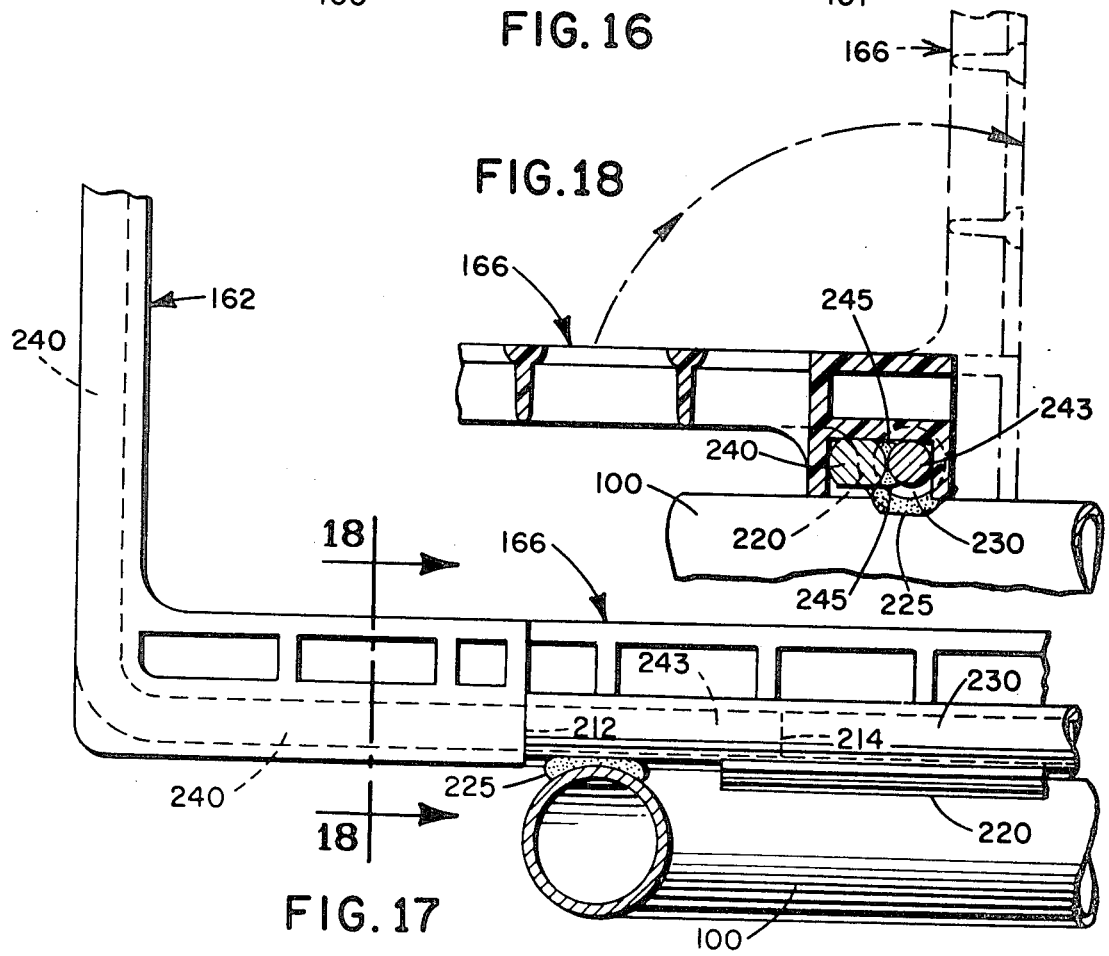
FIG. 18
FIG. 17

OVER-THE-COUNTER CART WITH HINGEDLY ATTACHED PLASTIC BASKET AND RETRACTING FRONT GATE

BACKGROUND OF THE INVENTION

The invention relates generally to the field of carts used for supermarkets and the like, and is directed particularly to a novel over-the-counter cart having a metal frame and a plastic basket.

The over-the-counter (i.e., OTC) carts of the prior art have baskets entirely of wire construction wherein the front basket rotates from a horizontal to a vertical position relative to the cart frame when not in use. A basket made entirely of wire construction, however, produces a basket that is unsatisfactory. First, it is very difficult for some people to either raise the basket to a vertical position or lower it to a horizontal position because of its weight. Second, the basket, in its horizontal position, has approximately the same height as a small child; consequently, the accidental dropping of the basket from its vertical position to a horizontal position could cause severe injury to a child that is struck thereby. This potential danger to small children has caused a great concern in the industry. Third, such prior art over-the-counter baskets are difficult to push and to maneuver, especially if they have some malfunction of the wheels.

Some over-the-counter carts in the prior art have a front gate which can be retracted to accommodate computer checkout scanning systems. In the grocery industry the trend at the checkout counter is rapidly moving toward what is known as scanning. This terms covers the pricing of merchandise by lines preprinted on the label of the product. The area of the package is passed over a glass section in the counter containing a scanning system; this mechanism is connected to the cash register which in turn is tied into the company's computer. Not only does the scanner display the price of the merchandise on the cash register tape, but it prints opposite it a description of the merchandise. In addition, the system signals to the company's computer that a sale has been made, records the margin of profit on the item, and deducts the items from the store's inventory. As a result of this system, the store is able to figure its profits daily as well as to maintain a constant control for purposes of reordering as well as elimination of items which have a slow turnover. If a prior art over-the-counter basket, without a retracting front gate is used with the scanner mechanisms, the front gate will interfere with the optical field of view of the scanner. It is necessary, therefore, to design a front panel to prevent obstructing the scanner. Ideally, over-the-counter cards and particularly those used in modern supermarkets and grocery stores should have the following characteristics:

1. They should be lighter in weight than prior art carts;
2. The basket should accommodate a computer checkout scanner system;
3. They should be able to withstand a great deal of abuse, particularly to the basket portion;
4. They should be easy to push and to maneuver;
5. They should not have a propensity to collect dirt and contaminates;
6. They should be able to withstand cleaning by strong detergents;
7. They should have sides of open latticework construction to allow customers to observe the contents of the cart from any angle; and
8. They should be attractive and should maintain their attractiveness over a longer period of time.

The prior art over-the-counter carts are constructed of open wirework construction do not satisfy all of the requirements set forth above. As mentioned in my U.S. Pat. No. 3,999,774 directed to a non-OTC cart with a stationary plastic basket, the deficiencies have chiefly to do with the basket portion. The wires in the basket are welded at the crossing points, and the basket is then chrome plated, the latter to provide a smooth, cleanable attractive surface. The welding process for such an item is intricate, as is the plating process. Frequently, due to a series of impacts over a period of time, the wire welds and the plating are broken. The plating is also subject to being removed by wear and by scraping against other objects. In addition to impact, the OTC baskets of the prior art are subject to having their open wirework construction corrode; that is the base metal exposed at the broken plating and broken wells will corrode. The cart, and particularly the basket, becomes unsightly and unattractive. At those same exposed points, food particles can become entrapped in small cracks and crevices, even if the baskets are periodically cleaned, resulting in unsanitary conditions. Additionally, articles placed in the basket can become pinched or snared by the unsecured wires and plating, thereby resulting in inconvenience to the customer and inflicting damage to the goods.

In addition to impact with other carts, the over-the-counter wire basket can be easily damaged by rotating the basket from its vertical position to its horizontal position and forcibly contacting the horizontal frame position. This impact of the basket with the horizontal frame can cause the basket to be deformed inwardly, giving rise to all of the above problems.

The impact problems previously mentioned give rise to another problem; repair of the wire-work constructed OTC basket. Not only is it difficult to bend deformed wires back into shape, it is difficult and expensive to reweld and replate them. The cart frame and the baskets are often integral with one another in prior art over-the-counter carts, and therefore they can not easily be taken apart to allow repair or replacement of the components. Replacement of the baskets require welds to be broken and are placed. Furthermore, complicated bending and interlocking of wires are necessary during disassembly and assembly. Frequently, the over-the-counter cart is simply not prepared; rather it is discarded when it becomes too unsightly or too unsanitary to be used.

Even the over-the-counter carts of the prior art which are in prime condition fail to meet the above requirements of lightness and compatibility to modern checkout scanner systems. Some of the other requirements are met if the basket is in prime condition; however, the wire over-the-counter carts in the prior art deteriorate rather quickly and soon become unsatisfactory in fulfilling a number of these requirements.

SUMMARY OF THE INVENTION

It is the overall object of this invention to provide a new and improved over-the-counter cart which overcomes the disadvantages of the prior art devices.

A specific object of this invention is to provide a new and improved cart which is lighter in weight than prior art OTC carts.

Another specific object is to provide a front gate which is retractable to a position remote from the front panel of the basket to accommodate a computer checkout scanner system.

Still another specific object of this invention is to provide a new and improved cart in which the basket is not easily damaged by impact, either with another cart or rotation from a vertical position to a horizontal position.

Another specific object is to provide a new and improved over-the-counter cart in which the basket is easy to clean.

A further specific object is to provide a new and improved over-the-counter cart in which the basket is easily replaced.

A still further specific object is to provide a new and improved over-the-counter cart which is less noisy than prior art over-the-counter carts.

Another specific object is to provide a new and improved OTC cart which is more attractive than prior art over-the-counter carts, and which maintains its attractiveness over a long period of time.

Another specific object is to provide a new and improved over-the-counter cart with a basket approximately one-half lighter than prior art wire baskets but having the strength of such baskets due to its novel reinforcement.

This invention comprises an OTC cart having a wheeled metal frame and a basket of plastic material. The front basket is shown to be made of plastic material, while the rear basket is shown to be of open wire-work construction. It is also contemplated that the rear basket can be constructed of plastic material. The metal frame is primarily of tubular construction. It has four caster wheels, a lower package shelf, and an upper horizontal frame portion to which the front basket is hingedly attached and to which the rear basket and handle is attached. The cart basket is made of plastic, such as polyethylene, which is strong, light weight, has a smooth finish, and deforms somewhat to absorb impact and then returns to its original shape. The sides, front, and bottom of the plastic basket are integrally molded in one piece. Thus, there are no seams to break, or cracks and crevices to collect dirt. The plastic does not rust or corrode. The use of a plastic basket has been found to significantly reduce the weight of an average cart. In addition, the lighter weight of the plastic basket makes it easier for the customer to push and to maneuver the cart. Moreover, a lighter basket reduces the risk of injury to a child's head or to the fingers of a customer when the basket is rotated from a vertical to a horizontal position.

The basket is almost entirely of open latticework construction, which further lightens it, and which allows the contents of the basket to be viewed from any angle. Strength and rigidity is provided to the basket by the use of suitable integral strengthening and tapering ribs, utilizing a cross-section configuration for the underside of the bottom panel which has a tapered form, and also by a novel hinged coupling between the basket and the metal cart frame. A metal unitary bar extends along the open perimeter of the plastic basket and along a portion of the underside of its bottom panel adjacent its rear edge. Separate metal hinge bars are attached to the unitary bar and extend along a portion of the underside of the plastic basket. The free ends of the hinge bars are received within a hinge tube mounted on the cart frame to allow the basket's rotation from hoirzontal position to a vertical position for purposes of nesting the carts. The hinge bar has a dual purpose: (1) to reinforce the unitary reinforcing bar which supports the upper edges and rear edges of the side panels and, (2) to act as hinging pins for rotating the basket to a vertical position. Consequently, the unitary reinforcing bar and the hinge bars provide stiffness to the basket structure without the necessity of including additional members.

Consequently, the unitary reinforcing bar prevents the outward bending of the upper and rear portion of the side panels while the hinge bars, welded to the unitary bar at the bottom area of the side panels, provide double strength at the bottom corner of the side panels and the bottom panel. Additionally, the unitary reinforcing bar extends along the free edges of the front panel which defines an opening to receive a removable gate. Extending the unitary bar along the front panel strengthens the front areas of the basket and prevents the bottom of the basket from sagging downward in the area of the front gate. A downwardly curved portion of the plastic basket at its rear edge provides additional reinforcement to the bottom panel at this point. This curved member engages the outer surface of the metal hinge tube so that the rotatable movement of the basket is guided along the outer surface of the tube. Consequently, the rear portion of the plastic basket is provided with additional strength and reinforcement.

As with prior art over-the-counter carts, a front gate is utilized which enables the cashier to unload the basket. However, in order to accommodate a computer checkout scanning system, the front gate of the instant invention is not only hingedly attached to the plastic basket to close the opening in the front panel, but also allows the front gate to be retracted from the front panel. Channels fitted with little guides in the underside of the panel allows the front gate to be lowered, upon opening, and then retracted to a position remote from the front panel to prevent obstructing the scanner. Consequently, goods can be easily and directly removed from the basket through the opening in the front panel and be passed over the scanner.

One of the key features of the invention is the fact that the basket can be replaced, if necessary, and further, that it can be replaced quite easily. The main portion of the plastic basket, that is, the integral sides front and bottom panel, can be removed by simply breaking it apart. A new basket can be added to the over-the-counter cart by simply slipping it within the confines of the metal unitary reinforcing bar and the metal hinging bar. The front gate is also easily assembled and disassembled. This operation is explained in detail in the following pages. Thus, damage to the basket does not require that the entire cart be discarded. Another advantage is that the plastic basket can be made in a variety of bright colors. This makes the cart more attractive and also more visible which reduces accidents both inside the store and outside the parking lot. The noise produced by movement of the inventive cart, or by impacting with other carts or objects, is considerably less than in the prior art OTC carts.

BRIEF DESCRIPTION OF THE DRAWINGS

FIG. 2 is a front elevational view of the same cart.

FIG. 7 is a vertical transverse sectional view taken along line 7—7 of FIG. 5.

FIG. 8 is a sectional view of an integral tapered rib used in the floor of the plastic basket.

FIG. 9 is a horizontal sectional view taken along line 9—9 of FIG. 4.

FIG. 10 is a sectional view taken along line 10—10 of FIG. 5.

FIG. 11 is a sectional view taken along line 11—11 of FIG. 5.

FIG. 13 is a top plane view of the cart as shown in FIG. 12.

FIG. 14 is a front elevational view of the rear wire basket taken along line 14—14 of FIG. 13.

FIG. 15 is a sectional view taken along line 15—15 of FIG. 12.

FIG. 16 is a side elevational view of the rear wire basket with the stationary wire side panels omitted.

FIG. 17 is a rear elevational view of the front plastic basket taken along line 17—17 of FIG. 3.

FIG. 18 is a sectional view taken along line 18—18 of FIG. 17.

FIG. 21 is a sectional view taken along line 21—21 of FIG. 19.

DESCRIPTION OF THE PREFERRED EMBODIMENT

Figure 1:
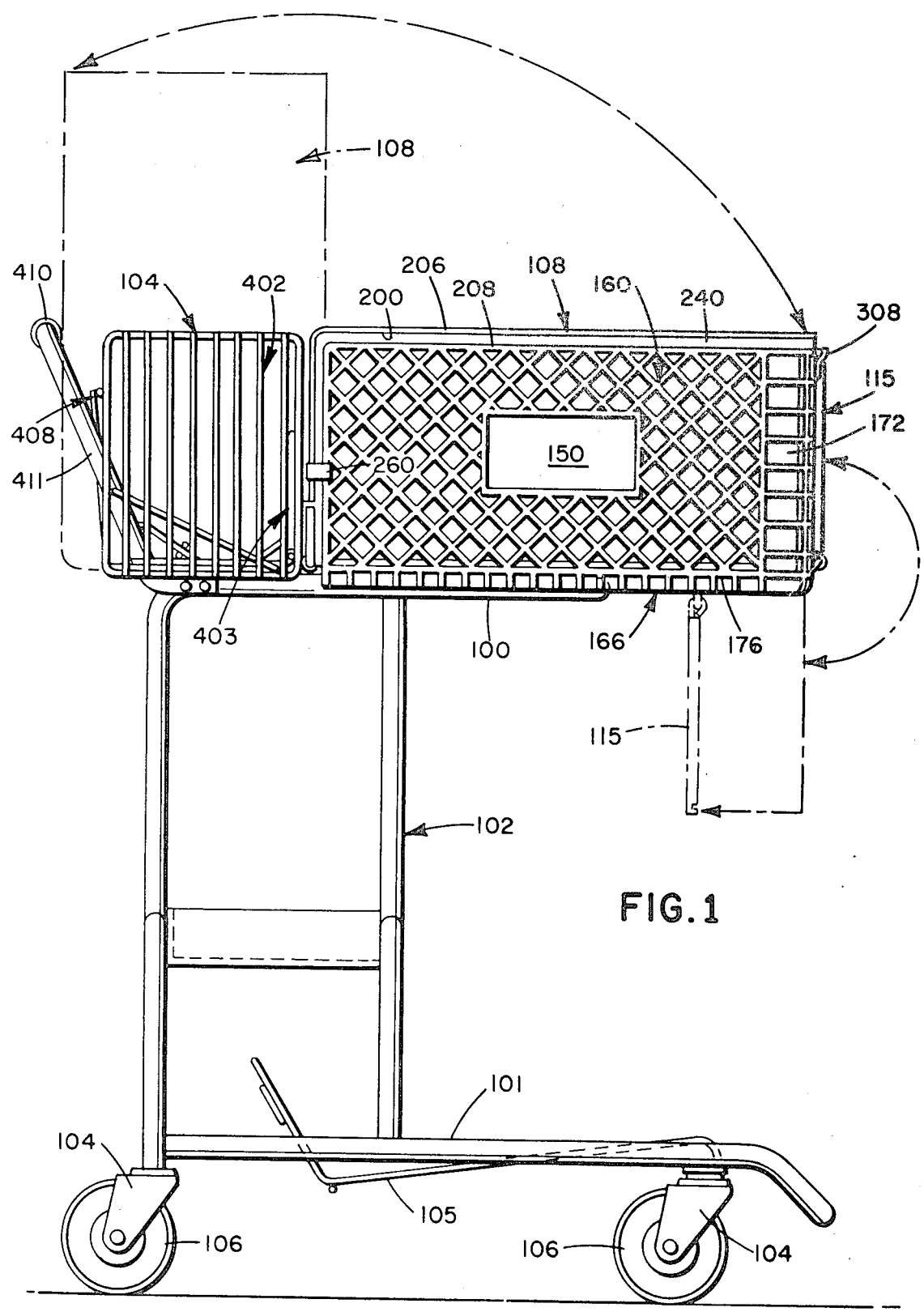
FIG. 1 is a side elevational view of an over-the-counter grocery cart according to this invention.

The over-the-counter grocery cart which is the subject of this invention consists of a number of interrelated elements, all of which are shown in at least some detail in FIG. 1. Each component will be explained in detail below. Basically, the inventive over-the-counter cart consists of a horizontal frame portion 100, a stationary rear wire basket 104, a front plastic basket 108, a front gate 115, and a child seat back panel 403.

As shown in FIGS. 1 and 2, the over-the-counter cart of the instant invention includes a conventional over-the-counter wheeled cart frame 102 comprising an attached upper horizontal frame portion 100, and a lower frame portion 101, including package shelf 105, attached to caster members 104 upon which is mounted wheels 106. As is known in the prior art, the lower frame portion is constructed in such a manner so that a plurality of grocery carts can be nested.

As indicated in FIG. 1, the front plastic basket 108 is capable of being rotated from a horizontal position to a vertical position relative to the horizontal frame portion 100. The means for hingedly attaching the front plastic basket 108 to the horizontal frame portion 100 is interrelated with a means for strengthening and reinforcing the basket. These latter features, consequently, will be discussed first.

Figure 3:
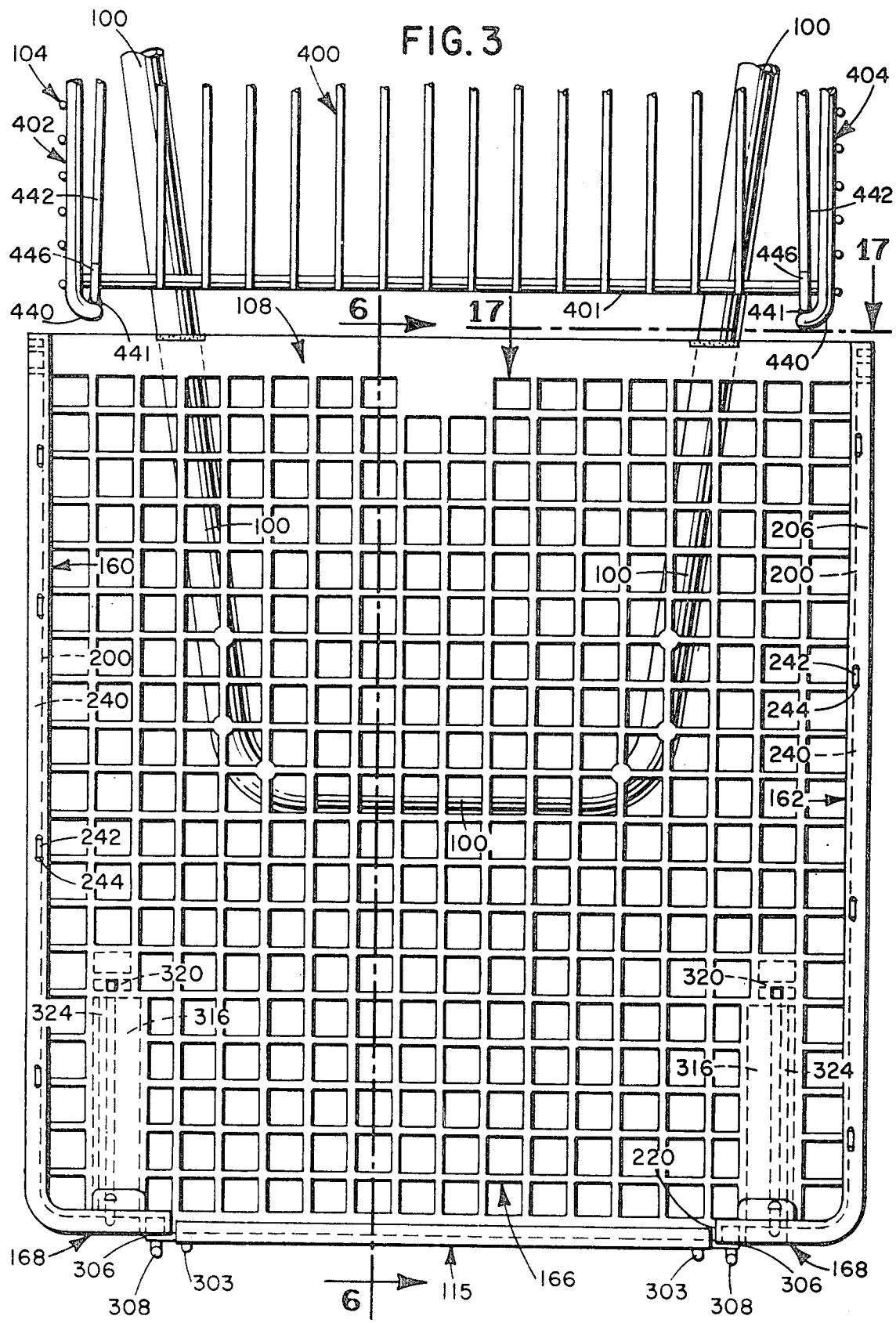
FIG. 3 is a top plan view showing the front plastic basket and a portion of the rear basket of the over-the-counter cart shown in FIGS. 1 and 2.

The front plastic basket 108 is manufactured of a plastic material such as polyethylene. The properties of polyethylene are ideally suited to this application, for polyetheylene is relatively strong, but panels manufactured of it are flexible enough to absorb some deformation, such as caused by impact, without breaking. Other materials, however, having similar properties can also be used. The plastic basket comprises two side panels, a front panel having an opening, a bottom panel and a front gate hingedly attached to the plastic basket to close the opening in the front panel. The sides, front and bottom panels are injection molded, integral with one another, in a single unit. The front gate, however, is not integrally attached to the other panels. In order to facilitate the cleaning of the basket, and to allow the user to observe the goods placed in the basket, basket 108 is constructed of open latticework. The lattice can be any one of a multitude of patterns. As shown herein, the pattern is diamond shaped. Basket 108 comprises a front panel 168, side panels 160, 162 and bottom panel 166 (FIG. 3). Bottom panel 166 is integrally attached to side panels 160, 162 and front panel 168. It is also of open lattice construction. However, solid portions are added to the open lattice construction at various points (see e.g., 176, 150, 172) as is known in the prior art to add strength to the various panels. In addition, a solid portion 150 can be added to the sides and front panel for the purpose of carrying a label or advertising. For example, at the corners, the lattice is an overlay of solid corner portions 172 (see FIG. 9) which gives rigidity and strength at key points.

A channel 200 extends along the side panels 160, 162 and the front panel 168 adjacent their free edge, defined by a pair of spaced parallel shoulders 208 and 206. Adjacent the rear edges of the side panels 160, 162, the channel 200 has a widen channel section 202 defined by a pair of parallel space shoulders 208 and 210 (see FIGS. 5 and 10). The widen channel 202 extends along a portion of the side panel adjacent the rear edge and continues along the underside of the bottom panel 166 for a portion of its width (see FIGS. 17 and 18). Widen channel 202 terminates at 212 (see FIG. 17) at which point a hinge member, consisting of a metal tube 230, is positioned and attached to horizontal frame 100. The connection of the basket 108 to the tube 230 will be discussed further on in this specification.

Figure 6:
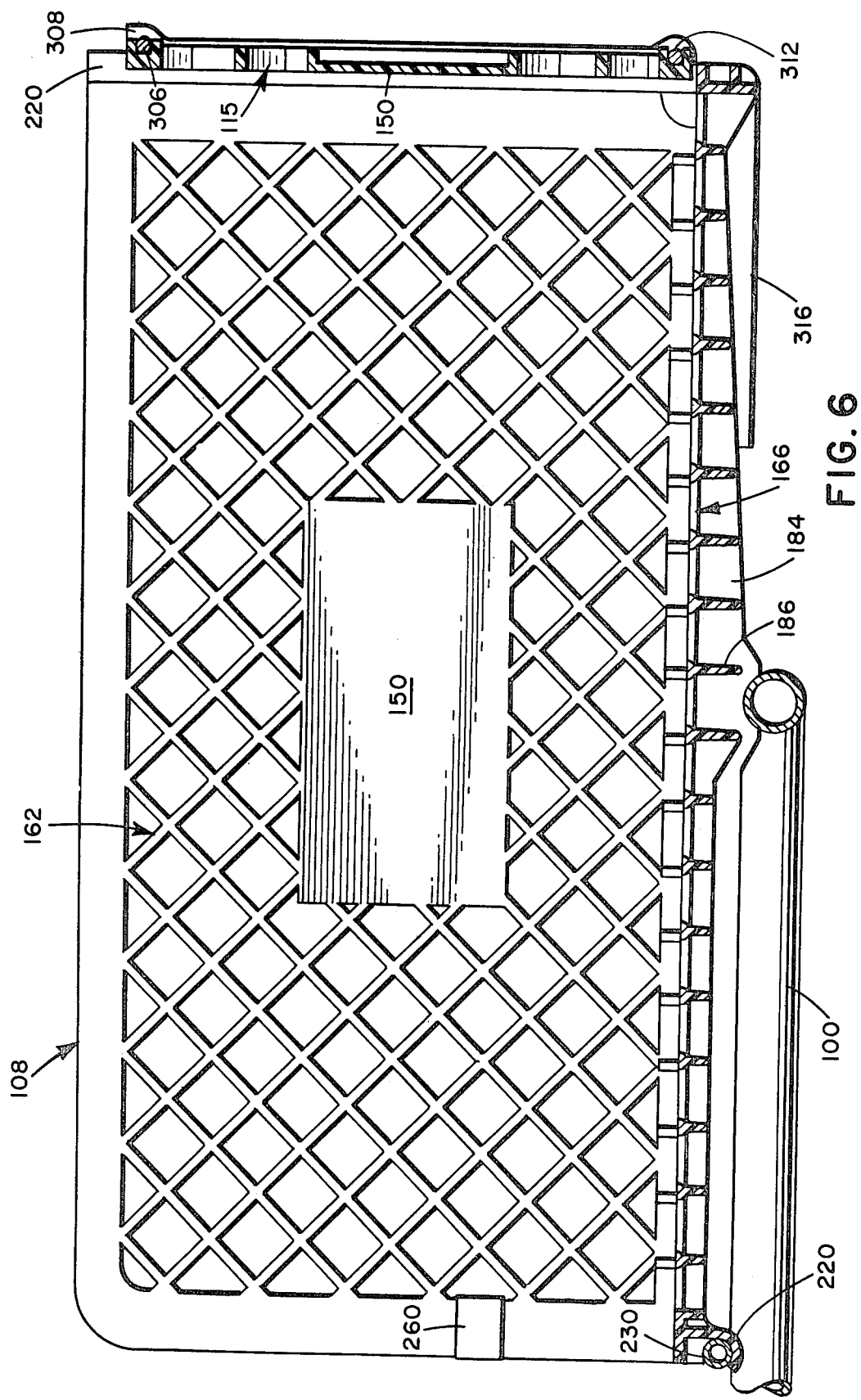
FIG. 6 is a vertical longitudinal sectional view taken along line 6—6 of FIG. 3.

It is necessary to have a strong, albeit light, basket that will withstand impact and high loading. Therefore, the basket must be provided with reinforcement to provide stiffness to the basket structure. Some reinforcement is provided by way of the construction of the basket itself. For example, solid portions 176 (FIG. 7), 150 (FIGS. 1, 2, 7) and 172 (FIG. 9) are provided to the lattice work overlay to provide rigidity and strength at key points. In addition, the bottom panel 166 has integral strengthening ribs 184 which have a tapered form to provide strength and rigidity (see FIGS. 8, 7 and 6). Furthermore the tapered underside 186 of bottom panel 166 (see FIGS. 7, 6), which rest on horizontal frame portion 100, allows the basket to have additional strength and rigidity at the critical areas which loads are concentrated. In attempting to keep the weight of the basket to a minimum, its strength is maximized by utilizing a metal reinforcing means along the baskets channel and its novel hinging interconnection with the rigid cart frame. Not only does this provided added strength to the OTC plastic basket, but it allows the basket to be made of materials that otherwise would not be suitable.

A metal unitary bar 240 extends along the channel 200 of the sides and front panels and along a portion of the widen channel 202 of the side panels and the underside of the bottom panel. Unitary bar 240 and its relationship with other components are shown in FIGS. 1, 2, 3, 4, 5, 10, 11, 12, 17 and 18. As shown in FIG. 11, unitary bar 240 comprises substantially circular cross-section having flatened sides, and is provided with a plurality of integral locking tabs 242 (see FIG. 3). Unitary bar 240 is received in channels 200, 202 which extends along the open perimeter of the basket 108 (i.e., free edges). Bar 240, therefore, extends from the underside of the basket adjacent its rear edge up and along side panels 160, 162 and along the upper portion of the side panels (see FIG. 5); bar 240 continues along the free edges of front panel 168 which defines an opening 220 into the basket (see FIG. 4). Shoulder 206 is provided with a plurality of upwardly extending openings 244 (see FIGS. 5, 3). Locking tabs 242 of unitary bar 240 are received in these openings 244 in order to interlock basket 108 with unitary bar 240. Additional means are utilized to maintain bar 240 within channel 200. Metal spring clips 260 are positioned along channel 200 of the sides and front panels to maintain the unitary bar in position between the shoulders 206, 208 and within the channel (see FIGS. 2, 4, 5, 11 and 12). A detailed cross-sectional view of the spring clip 60 is shown in FIG. 11. Along the underside of bottom panel 166, the unitary bar 240 continues along channel 202 and terminates at 212.

Metal bar 242 is positioned in the widen channel section 202 of each side panel contiguous to unitary bar 240 (FIGS. 5, 12) and extends down the side panels and along a portion of the underside of the bottom panel 166 (see FIGS. 17 and 18). Bar 242 is attached to unitary bar 240 by welding 245 or suitable means along their contiguous extension (see FIGS. 5, 10, 12 and 18). As shown in FIGS. 13, 17 and 18, each bar 242 extends beyond the terminating end 212 of unitary bar 240 and terminates in a hinging end 214. Hinging ends 214 are utilized to hingedly attach the plastic basket 108 to the horizontal frame portion 100, as will described below. Transversely mounted on the horizontal frame 100 is a metal tube 230 (see FIGS. 6, 17, and 18) which is welded to the frame at points 225 (see FIGS. 3, 17 and 18). The transverse mounting of tube 230 allows each of its open ends to be positioned to receive hinging end 214 of metal bar 242 (see FIGS. 17 and 18). As shown in FIGS. 1 and 18, consequently, basket 108 is capable of being rotated from a horizontal position to a vertical position relative to the horizontal frame portion. Integral to the bottom panel 166, adjacent its rear edge, is a downwardly curved member 220 (see FIGS. 6, 17). This member engages the outer surface of tube 230 to allow the surface of the tube to guide the rotatable movement of basket 108. Member 220 in conjunction with metal tube 230 provides strengthening and reinforcement to the critical rear portion of the bottom panel where loads are concentrated.

The above-described structure provides a hingedly attached plastic basket which is able to withstand impact and high loading despite its light weight. The unitary bar 240 is sufficiently stiff to prvent bending of the side panels. Metal bar 242 provides additional stiffness to give double strength to the bottom rear portion of the panels. Consequently, bar 242 has a dual purpose: (1) to reinforce unitary bar 240, to provide stiffness to the rear section of the basket, and (2) to act as a hinging pin for rotating the basket. Moreover, the extension of unitary bar 240 along the channel of the front panel 168 defining an opening 220 (FIG. 4) into the basket not only strengthens the front side areas of the basket but also prevents the bottom area of the basket, adjacent the front panel, from sagging downwardly. As can be seen from the above description, the weight of the basket is kept to a minimum and its strength maximized by a novel interrelationship between the OTC metal cart frame and the OTC basket which utilizes the metal frame as a reinforcing member for the plastic basket. The connection of unitary bar 240 and metal bar 242 to the metal cart frame is made via the rigid metal tube 230.

Figure 19:
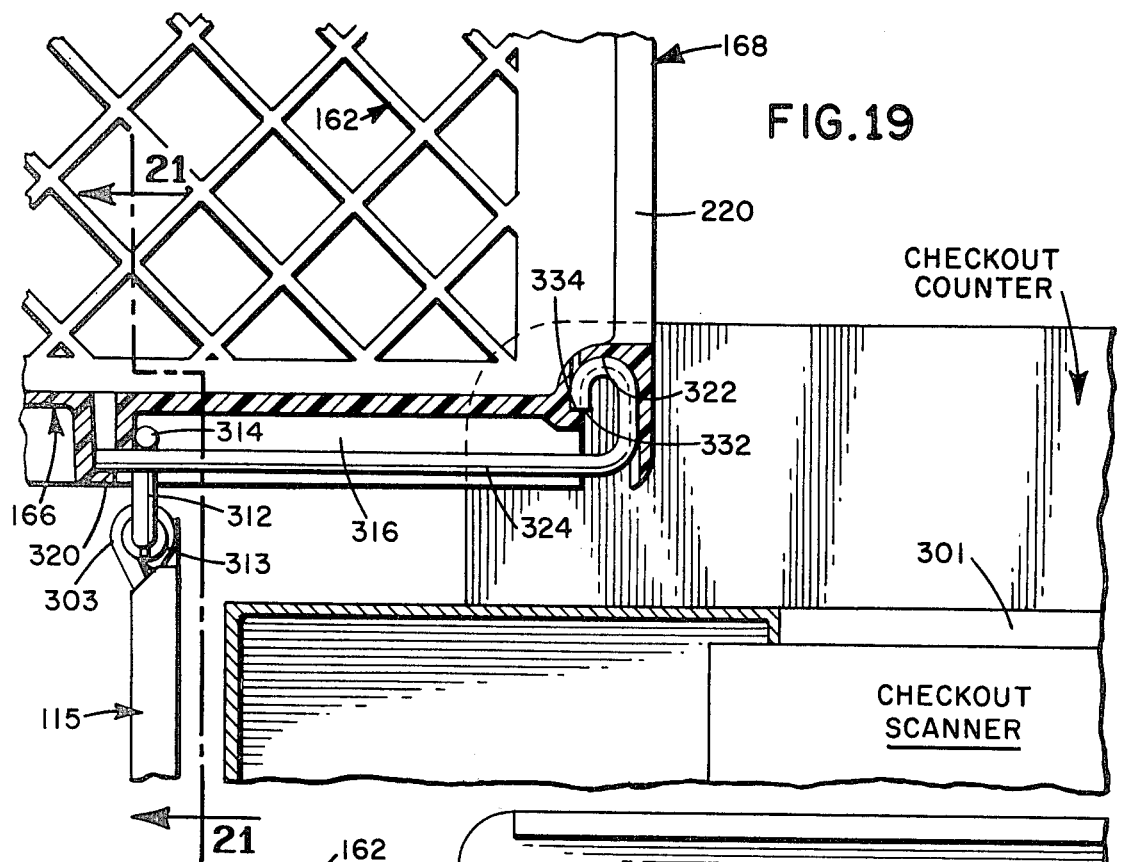
FIG. 19 is a sectional view of the forward portion of the plastic basket in juxtaposition with a checkout counter code scanner.
Figure 20:
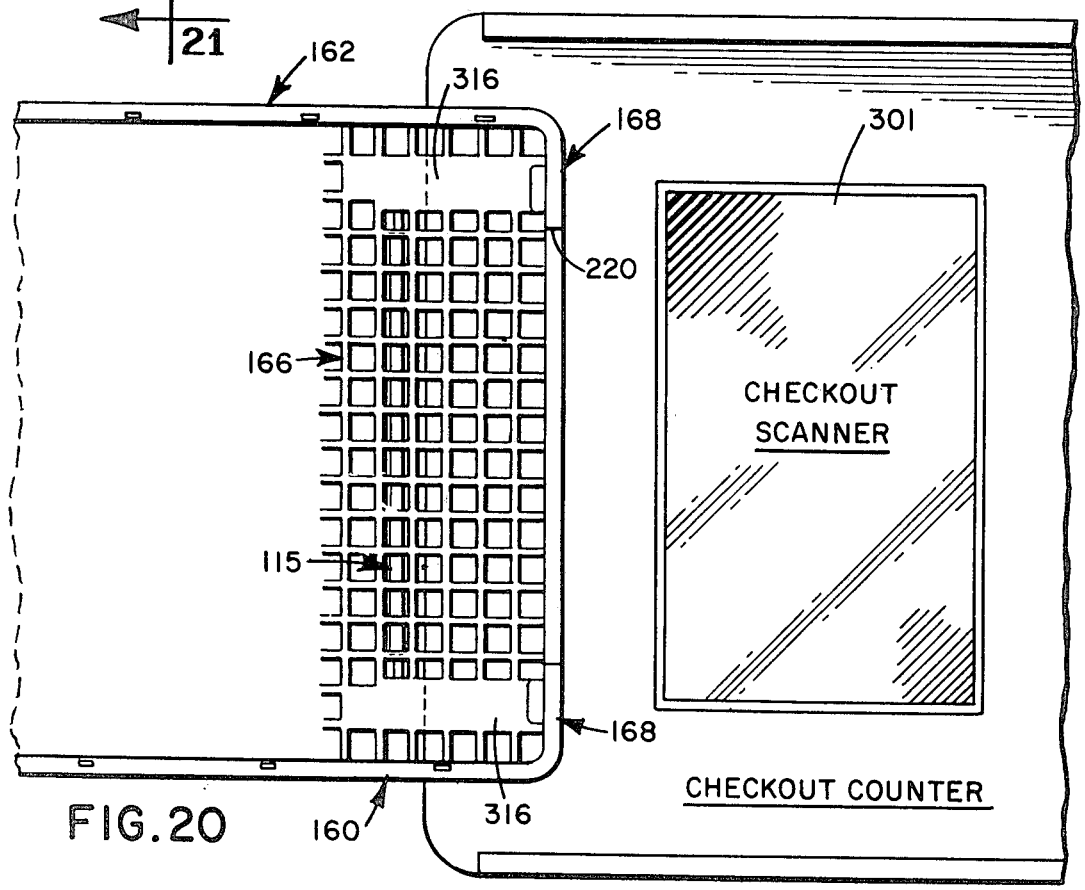
FIG. 20 is a top plane view of the over-the-counter cart of this invention in juxtaposition with a checkout counter code scanner.

Gate 115 of the invention is best shown by FIGS. 19, 20 and 21. The front gate can be constructed of plastic or other suitable materials. As shown in FIGS. 19 and 21, in order for the OTC cart to accommodate a computer checkout scanner system 301 when the front panel 168 is in juxtaposition with the scanner, it is necessary for the front gate 115 to be retractable to a position remote from the front panel in the scanner. In this way, the gate can be moved to a position to prevent obstructing the optical path of the scanner. As mentioned previously, the front panel 168 has a shape defining an opening 220 into the basket (see FIGS. 4, 19 and 20). Front gate 115, conforming to the shape of this opening, is pivotedly attached to the basket by an attachment assembly so that the gate can be moved from a position closing this opening to an open position, or to a further position remote from the front panel 168. (see FIG. 19).

Figure 4:
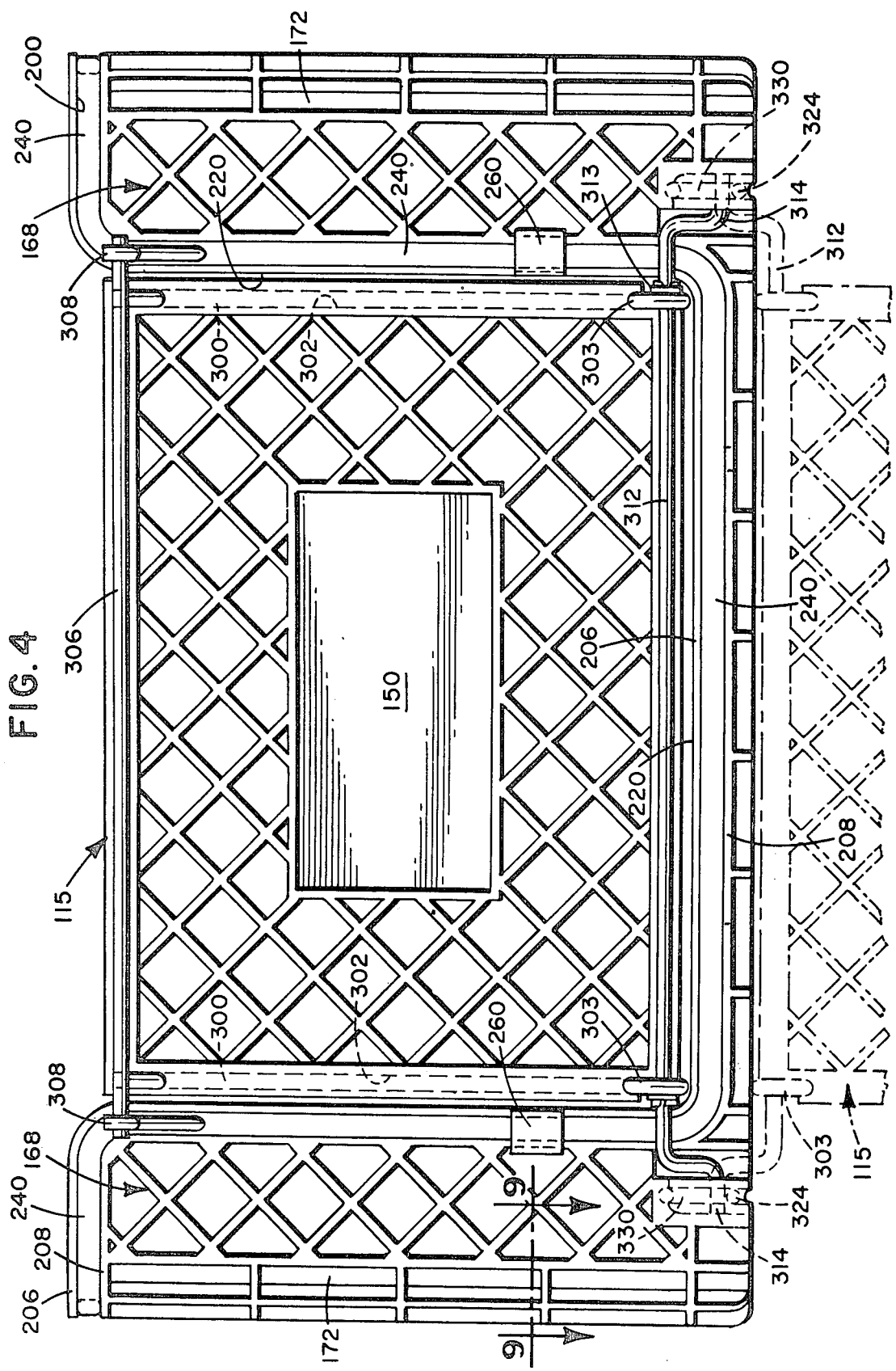
FIG. 4 is a front elevational view and enlarged scale of the front plastic basket of the invention.
Figure 5:
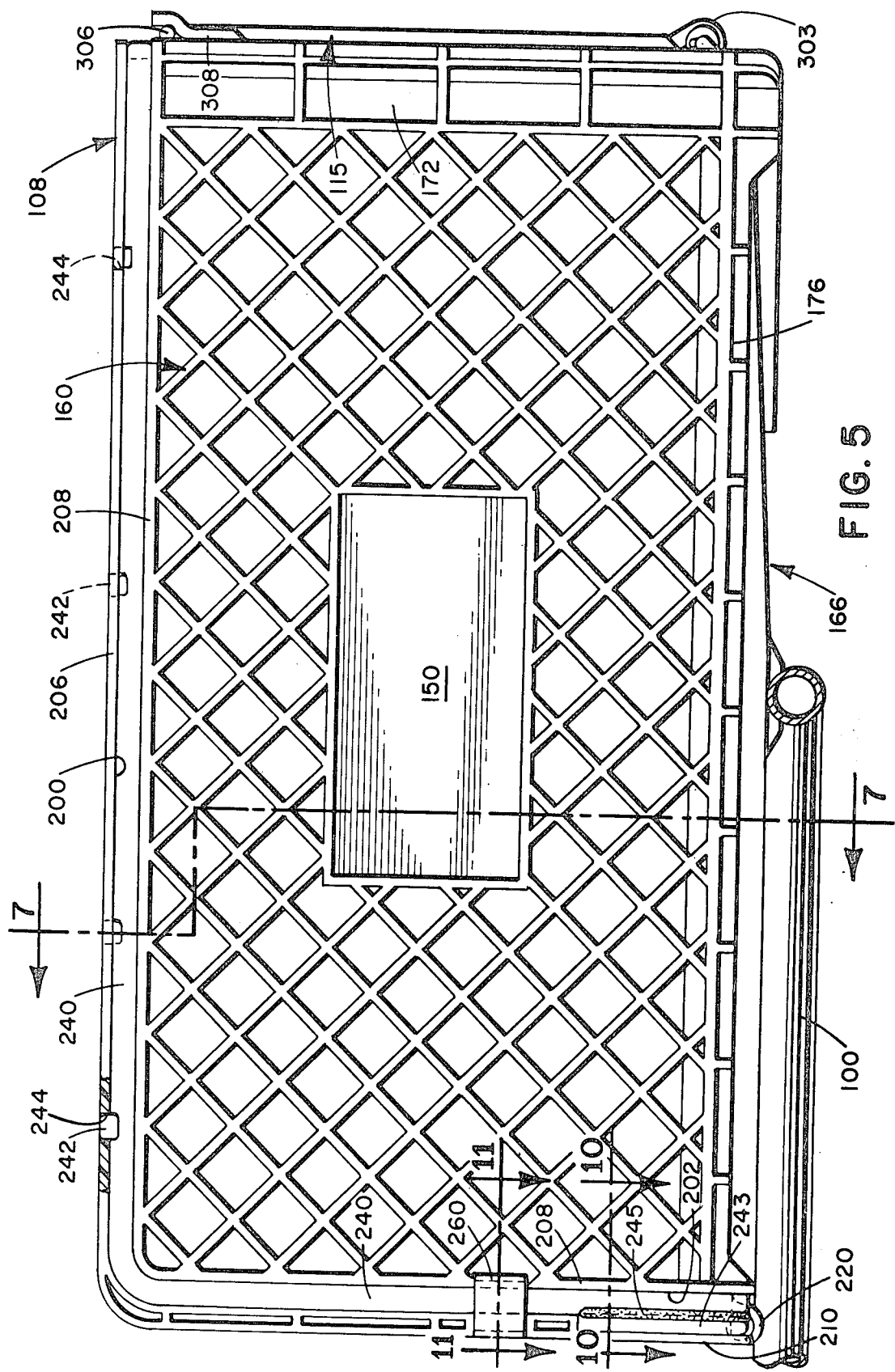
FIG. 5 is an enlarged side elevation of the front plastic basket of the invention.

The attachment assembly comprises a pair of spaced gate support wires 300 which are positioned in grooves 301 on either side of the front gate 115 (see FIG. 4). The lower position of the support wires have a loop shape 302 (FIGS. 4, 5 and 19). The upper portion of the wires have a section which is exposed from the gate grooves 301 and attached by welding or other suitable means to a horizontal cross-latching bar 306 (FIGS. 2, 4, 5 and 6) extending beyond the side edges of the front panel. Attached to unitary bar 240 at each upper portion of the front panel is a latching member 308 (FIGS. 3, 4, 5 and 6) having a projecting shoulder which receives the cross-latching bar 306 when the front gate 115 is in a closed position. Latching members 308 are attached to the unitary bar 240 by welding or other suitable means.

As is best shown in FIGS. 4 and 21, an attachment bar 312 having each of its free ends 314 comprising a substantially L-shaped portion extending outwardly, is received through the loop portion 302 of the support wires 300. Suitable retaining washers 313 are utilized to prevent transverse movement of the loop portion 302 relative to the attachment bar 312, and therefore, any movement relative to the front opening 220. Integral to bottom panel 166 are a pair of spaced channel 316 (see FIGS. 21, 19), each of these channels extending towards the rear of the basket and being substantially parallel to the side panels (see FIGS. 3, 19). Each attachment channel 316 has an integral support 320 at its rearmost portion, while its frontmost portion has a substantially vertical cross-sectional configuration comprising a recess 322 (see FIG. 19). A guidebar 324 (FIGS. 21, 19) is positioned in each channel 316, one end of which is held by rear channel support 320. The other end of guidebar 324 has a substantially vertical cross-sectional configuration comprising a projection or loop portion 330. This portion is received within recess 322 of channel 316 thereby allowing end 332 of loop portion 330 to engage front channel support 334. With guidebar 324 positioned and secured within each channel 316, the front panel 115 can be slid from a position in juxtaposition to the front panel 168 to a position remote from the front panel as shown in FIG. 19.

The front gate can be attached to the basket by positioning attachment bar ends 314 within channel 316, engaging one end of bar 324 with rear support 320 and then pushing the loop portion 330 of bar 324 upwardly towards recess 330. By applying sufficient force, the wall of the front panel will spring outwardly, enabling loop portion 330 to engage recess 332. When loop 330 engages the recess the wall of the front panel will spring back to its former position and the guidebar 324 will be held firmly in place. As shown in FIGS. 4 and 19, the positioning of the attachment bar ends 314 at the frontmost portion of channel 316 allows the attachment bar 312, and therefore front panel 115, to have a greater degree of vertical movement than when positioned at other points along channel 316. This allowable vertical movement is due to the loop shaped configuration of portion 330 of guidebar 324. Consequently the front gate 115 can be opened by lifting the gate so that cross-latching bar 306 extends vertically above latching members 308. At that point, gate 115 can be lowered as shown in FIG. 4 and, thereafter, retracted away from front panel 168, as shown in FIG. 19.

Unlike front basket 108, rear basket 104 is stationary and is mounted by welding support members 401 to the horizontal frame portion 100 (see FIGS. 3, 12, 13, 14 and 16). Rear basket 104 comprises stationary side panels 402, 404 stationary bottom panel 400 and stationary rear panel 408 and a seat back panel 403 pivotally attached to basket 104 (see FIGS. 3, 12, 13, 14 and 16). The spacing of stationary side panels 402 and 404 are such that when the front basket 108 is rotated to a vertical position, side panels 402 404 become positioned between side panels 160 162 of the hinged front plastic basket (see FIG. 3). Rear basket 104 is shown to be of wire construction, but it is also contemplated that other materials could be used including plastic.

Figure 12:
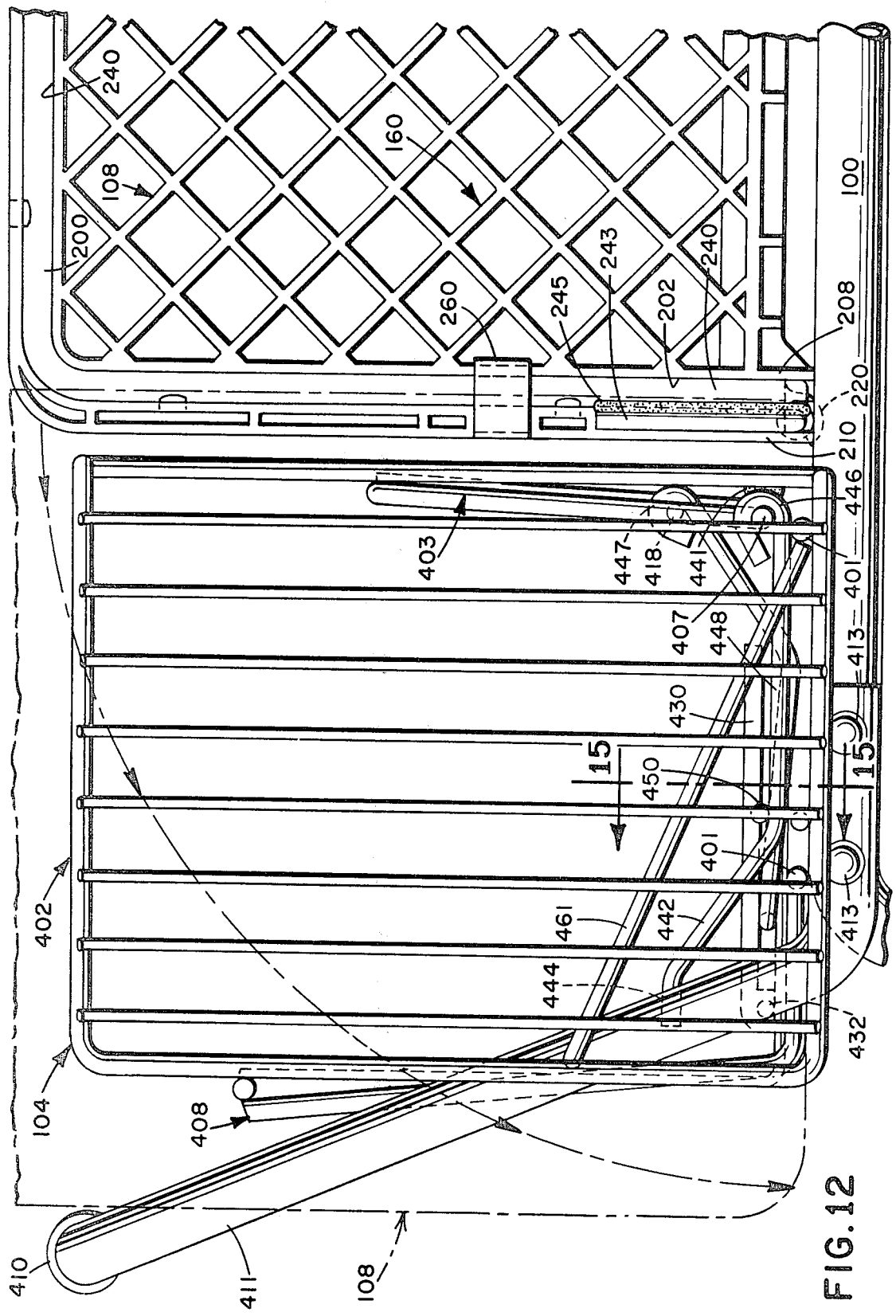
FIG. 12 is a side elevational view at an enlarge scale of the rear wire basket of the invention.

A pair of spaced upwardly inclined rear handle posts 411 carrying handle 410 extend through the rear panel 408 through openings 415 therein and are attached to the horizontal frame portion 100 by rivets 413 or other suitable means (see FIGS. 12, 13 and 14). Further support to the rear basket and the handle posts 411 are obtained with braces 461. Brace 461 can be welded to support 401 and the vertical wires of side panels 402, 404. The free end can be positioned and attached to posts 411.

The base of the child seat 430 is pivotedly attached to transverse rod 432 at the rear portion of basket 104; this rod being welded to the bottom panel 400 at points 433 on each side of the rear basket (see FIGS. 12, 13, 14 and 16). Rear panel 408 is provided with two leg openings 417 (See FIGS. 13 and 14) through which the child's legs can protrude when sitting in the seat. Thus, the child seat 430 can be pivoted to a first position in which the child can set upon it as shown in FIG. 16 by dotted lines, and also to a second position wherein it closes leg openings 417 to enable articles to be placed in the rear basket as shown in FIG. 16 by solid lines.

The interconnection of the seat back panel 403 at the forward portion of basket 104 and the child seat 430 will now be described. As will be shown, the movement of the seat back panel 403 from a first position, substantially perpendicular to the bottom panel 400, to a second position in juxtaposition to the bottom panel, as shown in FIG. 16 in dotted lines, will cause the child seat 430 to move from a first position, in juxtaposition to the front panel 400, to a second position covering leg opening 417. This can be seen from FIGS. 13 and 3, stationary side panels 402, 404 at the forward portion of basket 104 has a horizontal cross-sectional configuration comprising an inwardly curved section 440. Attached to the lower portion of curve section 440, at each side of basket 104, is rail 442. (see FIGS. 12, 13 and 16). Rail 442 can be attached to curve section 440 by welding or other similar means. As best shown in FIGS. 12 and 13, rail 442 consists of a metal bar having a loop shape end 446 at the forward portion of basket 104 which end is attached to curve section 440; rail 442 extends toward the rear portion of basket 104 and has a section thereof which inclines upwardly. The free end of rail 442 is received and secured in opening 444 of handle post 411. Seat back 403 comprises two transverse horizontal rods 407, 418; rod 407 extends along the lower portion of seat back panel 403 while rod 418 is spaced above rod 407 (see FIGS. 12, 14 and 16). Each end of rod 407 extends beyond seat back 403 and is received within loop ends 446 to allow pivotal movement of the seat back panel with respect to the stationary bottom, side and rear panels (see FIGS. 12, 13, 14 and 16).

Coupling the seat back panel 403 to seat 430 is lifting bar 448, located at each side of basket 104. Lifting bar 448 consists of a metal bar having a loop shape and 447 at the forward portion of basket 104, which end receives rod 418. Lifting bar 448 extends toward the rear portion of basket 104 and has a section thereof (i.e., 449) positioned at the underside of seat 430 (see FIGS. 12, 13 and 14). Movably coupling the lifting bar 448 to rail 442 is a horizontally oriented U-shaped guide 450 (see FIGS. 12, 13, 14 and 16). As can be seen in FIGS. 13 and 14, guide 450 is attached at its curved portion to lifting bar 448 by welding 451 (see FIG. 15) or other suitable means, while rail 442 is positioned between the free ends of guide 450. Referring to FIG. 16, consequently, as seat back 403 is rotated downwardly, lifting bar 448 which is positioned below the pivotedly attached seat 430, is guided upwardly along rail 442. Therefore, lifting bar 448 will force seat 430 to move from its first position in juxtaposition to the bottom panel 400 to a second position closing leg openings 417 so that articles can be loaded in the rear basket 104. When seat basket 403 is rotated upwardly, lifting bar 448 will, accordingly, move downwardly along rail 442 to its lower position thereby allowing seat 430 to be pivoted downwardly to its first position whereby a child can sit on it.

A novel feature of this invention is the fact that the cart basket has been uniquely designed so that the plastic over-the-cart basket can be easily replaced if it is damaged. As mentioned previously, one of the disadvantages of the existing over-the-counter wire baskets is that, once broken, it is difficult and expensive to repair, if it can at all be repaired. If the plastic over-the-counter basket of this invention becomes damaged, it can easily be removed and replaced. The front gate 115 can be easily removed and replaced by merely removing the cross latching bar 306 which are coupled to the upper portion of gates support wire 300. Once this is done, wires 300 can be freed by sliding them along grooves 301 on either side of gate 115; wires 300 can then be inserted in the grooves of a new gate and cross bar 306 can then be attached.

As discussed previously, the front gate 115 together with its attachment assembly can be easily removed. This can be done by applying outward pressure to the lower portion of front panel 168 thereby removing guide bar 324 from its lock position in channel 316. After removing guidebar 324, attachment bar 312, wires 300 and front gate 115 can be removed from the basket.

To replace over-the-cart basket 108, spring clips 260 are removed and the basket is simply broken into pieces and separated from unitary bar 240 and hinging bar 242. A new OTC basket is simply installed as follows: with unitary bar 240 in place along channel 200 of the front panel 168, the new basket is deformed inwardly along the rear portions of the side panels and aligned with bars 240 and 242; then the bars 240, 242 are finally forced into channels 200 and 202.

Obviously, many modifications and variations of the above-described preferred embodiment will become apparent to those skilled in the art from a reading of this disclosure. For example, rear basket 104 can be made of materials other than metal including, for example, a plastic material such as polyethylene. The various bars and rods disclosed above can be made of materials other than metal and are not limited to the various cross-sectional configurations shown or described above. It should be realized that the invention is not limited to the particular apparatus disclosed, but its scope is intended to be governed only by the scope of the appended claims.

I claim:

1. A plastic basket for use with a wheeled over-the-counter cart frame having a horizontal frame portion to which said basket is to be attached, comprising:
   a pair of opposed side panels, a bottom panel, and a front panel attached together along their contiguous edges, said side panels and said bottom panel terminating in a rear edge, a channel extending from the underside of said bottom panel adjacent its rear edge and continuing up and along said side panels adjacent their rear edges,
   a pair of spaced, parallel shoulders on said side panels, said front panel and said bottom panel to define said channel for receiving a reinforcing means for reinforcing said basket, said channel having a widened section, said section extending from the underside of said bottom panel to a position on the lower portion of said side panels adjacent their rear edge, and wherein said channel widened section also receives a hinge means, attached to said reinforcing means, for hingedly attaching said basket to said horizontal frame portion and to provide added stiffness to the basket,
   said reinforcing means being adapted to attach said basket to said horizontal frame portion of the over-the-counter cart frame, and
   a hinge member mounted to said horizontal frame portion for hingedly receiving said hinge means.

2. The plastic basket of claim 1 further comprising a plurality of openings in one of said shoulders to receive locking tabs carried by said reinforcing means.

3. The plastic basket of claim 1 wherein said panels have free edges defined by the open perimeter of said basket,
   said channel further extending along said side panels adjacent their rear edges, extending along said side panels adjacent their free edges, and continuing along said front panel adjacent its free edge.

4. The plastic basket of claim 1 wherein said side panels, said bottom panel and said front panel are integrally molded with one another, and are principally of open lattice construction.

5. The plastic basket of claim 4 wherein at least a portion of the underside of said bottom panel has a vertical cross-sectional configuration having a tapered form.

6. The plastic basket of claim 1 further comprising a plurality of means positioned along said channel and covering a portion of said channel for maintaining said reinforcing means within said channel.

7. The plastic basket of claim 1 wherein said hinge means is adapted to hingedly attached said basket to said horizontal frame portion whereby said basket is capable of being rotated from a horizontal position to a vertical position relative to said cart frame.

8. The plastic basket of claim 1 wherein said side panels, said bottom panel and said front panel are integrally molded with one another and are principally of open lattice construction,
   said hinge means is adapted to hingedly attached said basket to said horizontal frame portion whereby said basket is capable of being rotated from a horizontal position to a vertical position relative to said cart frame.

9. The plastic basket of claim 1 further comprising a plurality of means positioned along said channel and covering a portion of said channel for maintaining said reinforcing means within said channel,
   and a plurality of openings in one of said shoulders to receive locking tabs carried by said reinforcing means.

10. The plastic basket of claim 7 wherein said panels have free edges defined by the open parameter of said basket,
    said channel further extending along said side panels adjacent their free edges, extending along said side panels adjacent their free edges and continuing along said front panel adjacent its free edge.

11. The plastic basket of claim 9 wherein said panels have free edges defined by the open perimeter of said basket,
    said channel further extending along said side panels adjacent their free edges, extending along said side panels adjacent their free edges and continuing along said front panel adjacent its free edge.

12. The plastic basket of claim 1 further comprising a hinge member mounted to said horizontal frame portion for hingedly receiving said hinge means.

13. The plastic basket of claim 1 wherein said reinforcing means comprises a unitary bar extending along the channel of said front and side panels,
    a first portion of said unitary bar extending along the widen channel section of one of said side panels and continuing a predetermined distance in said widen channel section of the underside of said bottom panel and terminating in a first end,
    a second portion of said unitary bar extending along the widen channel section of the other of said side panels and continuing a predetermined distance in said widen channel section of the underside of said bottom panel and terminating in the second end.

14. The plastic basket of claim 13 wherein said hinge means comprises a first and second bar, said first bar being attached to said first unitary bar portion and extending beyond said first end and terminating in a first hinging end, said second bar being attached to said second unitary bar portion and extending beyond said second end and terminating in a second hinging end.

15. The plastic basket of claim 14 wherein said hinge member comprises a tube having first and second open ends, said first open end receiving said first hinging end and said second open end receiving said second hinging end whereby said basket can be rotated from a horizontal position to a vertical position relative to said cart frame.

16. The plastic basket of claim 15 wherein at least a portion of said bottom panel adjacent its rear edge has a downwardly curved member, said curved member engaging the outer surface of said tube whereby said tube guides the rotatable movement of said basket to provide strengthening and reinforcement thereof.

17. The plastic basket of claim 1 wherein one of said panels has a shape defining an opening into said basket, said basket further comprising a movable gate closing said opening, a gate attachment means for pivotally attaching said gate to said basket whereby said gate can be moved from a closed position, closing said opening, to an opened position.

18. The plastic basket of claim 17 wherein said one panel is the front panel and said gate is a front gate, said basket further comprising a latching means for securing said front gate in its closed position, and said attachment means including retraction means for enabling said front gate, upon opening, to be retracted to a position remote from said front panel.

19. The plastic basket of claim 18 said attachment means further including a pair of generally vertically oriented spaced gate support wires attached to said front gate and being substantially parallel to the outside surface of said front gate, each of said gate support wires being substantially coextensive with said front gate, said attachment means further including an attachment bar in which each of its free ends comprises a substantially L-shaped portion extending outwardly, said gate support wires being pivotally attached to said attachment bar.

20. The plastic basket of claim 19 wherein said retraction means comprises a pair of generally horizontally oriented spaced attachment channels in said bottom panel, each of said attachment channels being substantially parallel to said side panels, said retraction means further including a guide means engaging each of said attachment channels for slidably receiving said attachment bar free ends.

21. The plastic basket of claim 20 wherein the rearmost portion of each attachment channel has a support, said guide means comprising a bar, one end thereof engaging said support, the other end thereof being compressionally fitted into said channel.

22. The plastic basket of claim 21 wherein said other end of said bar comprises a first substantially vertical cross-sectional configuration, wherein the frontmost portion of said attachment channel has a second substantially vertical cross-sectional configuration, one of said cross-sectional configuration comprising a recess and the other of said cross-sectional configuration comprising a projection compressionally received within said recess.

23. The plastic basket of claim 19 further comprising a substantially horizontal cross latching bar, said latching bar being attached to said gate support wires and engaging said latching means when said front gate is in a closed position.

24. The plastic basket of claim 23 wherein each free end of said latching bar extends outwardly beyond said front gate, said latching means comprising a pair of spaced members having projecting shoulders, each of said shoulders being coupled to said front panel and being positioned so as to receive a free end of said latching bar.

25. The plastic basket of claim 22 further comprising a substantially horizontal cross-latching bar, said latching bar being attached to said gate support wires, said latching bar having free ends which extend outwardly beyond said front gate, said free ends engaging said latching means when said front gate is in a closed position, said first vertical cross-sectional configuration further comprising a curved portion so that said attachment bar has vertical movement when positioned adjacent said first cross-sectional configuration, whereby said front gate is moved from a closed position to an open position by vertically moving said latching bar free ends from contact with said latching means and pivoting downwardly.

26. A cart having separate rear and front baskets for use with a wheeled cart frame, said cart having a horizontal frame portion to which said baskets are to be attached, said front basket being constructed of plastic open latticework and comprising:

a pair of opposed side panels, a bottom panel, and a front panel attached together along their contiguous edges, a pair of spaced, parallel shoulders on said side panels, said front panel and said bottom panel to define a channel for receiving reinforcing means, said reinforcing means being adapted to attach said basket to said horizontal frame portion, said rear basket having a rear and forward portion and being attached to said horizontal frame portion in such a manner to prevent relative movement of said rear basket with respect to said horizontal frame portion, said rear basket comprising: a pair of opposed stationary side panels, a stationary rear panel, a stationary bottom panel and a seat back panel, and further comprising rail means attached to said stationary side panels for pivotally attaching said seat back panel to said rear basket, a pair of spaced upwardly inclined rear posts having a handle carried by said posts, said posts extending through said stationary rear panel and being attached to said horizontal frame portion, a child's seat pivotally attached to said stationary bottom panel at the rear portion of said rear basket, said stationary rear panel comprising at least one leg opening for accomodating the legs of a child sitting in said child seat, said child seat adapted to be movable between a first position in juxtaposition to said stationary bottom panel and a second position covering said leg openings, said seat back panel is movable between a first seat back position substantially perpendicular to said stationary bottom panel and a second seat back position and juxtaposition to said stationary bottom panel, said stationary side panels having at the forward portion of said rear basket a horizontal cross-sectional configuration comprising an inwardly curved section, and, said rail means comprising a first bar having a first loop-shaped end defining a first opening, said first loop-shaped end being attached to said curved section of one of said stationary side panels, the other end of said first bar extending towards the rear portion of said rear basket and having a section thereof inclined upwardly.

27. A cart of claim 26 wherein a lower portion of said seat back panel has first and second outward projections, said rail means further comprising a second bar having a second loop-shaped end defining a second opening, said second loop-shaped end being attached to said curved section of the other of said stationary side panels, wherein said first and second openings receive said first and second projections, respectively, the other end of said second bar extending towards the rear portion of said rear basket and having a section thereof inclined upwardly.

28. The cart of claim 27 wherein said rear basket comprises a lifting means for moving said child seat from said first position to said second position in response to the movement of said seat back panel from said first seat back position to said second seat back position.

29. A cart of claim 28 wherein said lifting means comprises a third bar having a third loop-shaped end, said third loop-shaped end being pivotally attached to said seat back and the other end of said third bar extending toward the rear portion of said rear basket and being positioned at the underside of said child seat.

30. The cart of claim 29 wherein said lifting means comprises a fourth bar having a fourth loop-shaped end and being pivotally attached to said seat back at a position horizontally spaced from said third bar, the other end of said fourth bar extending toward the rear portion of said rear basket and being positioned at the underside of said child seat.

31. The cart of claim 30 further comprising guiding means for guiding the movement of said third and fourth bars along said first and second bars, respectively, in response to the movement of said seat back panel from said first seat back position to said second seat back position.

32. A cart of claim 26 wherein said side panels, said bottom panel and said front panel are integrally molded with one another and are principally of open lattice construction, said reinforcing means being adapted to hingedly attach said front basket to said horizontal frame portion whereby said front basket is capable of being rotated from a horizontal position to a vertical position relative to said cart frame.

33. A cart having separate rear and front baskets for use with a wheeled cart frame, said cart having a horizontal frame portion to which said baskets are to be attached, said front basket being constructed of plastic open latticework and comprising:

a pair of opposed side panels, a bottom panel, and a front panel attached together along their contiguous edges, said side panels, said bottom panel and said front panels are integrally molded with one another and are principally of open lattice construction, a pair of spaced, parallel shoulders on said side panels, said front panel and said bottom panel to define a channel for receiving reinforcing means, said reinforcing means being adapted to attach said basket to said horizontal frame portion, said rear basket having a rear and forward portion and being attached to said horizontal frame portion in such a manner to prevent relative movement of said rear basket with respect to said horizontal frame portion, said rear basket comprising: a pair of opposed stationary side panels, a stationary rear panel, a stationary bottom panel and a seat back panel, and further comprising rail means attached to said stationary side panels for pivotally attaching said seat back panel to said rear basket, a pair of spaced upwardly inclined rear posts having a handle carried by said posts, said post extending through said stationary rear panel and being attached to said horizontal frame portion; and said reinforcing means being adapted to hingedly attach said front basket to said horizontal frame portion whereby said front basket is capable of being rotated from a horizontal position to a vertical position relative to said cart frame.

34. The cart of claim 33 wherein one of said panels of said front basket has a shape defining an opening into said basket, said front basket further comprising a movable gate closing said opening, a gate attachment means for pivotally attaching said gate to said front basket whereby said gate can be moved from a closed position, closing said opening, to an open position.

35. The cart of claim 34 wherein said one panel is a front panel and said gate is a front gate, further comprising a latching means for securing said front gate in its closed position, said attachment means including retraction means for enabling said front gate, upon opening, to be retracted to a position remote from said front panel.

36. The cart of claim 35 wherein said reinforcing means is adapted to hingedly attach said front basket to said horizontal frame portion whereby said basket assembly is capable of being rotated from a horizontal position to a vertical position relative to said cart frame.

37. The cart of claim 36 wherein said side panel, said bottom panel and said front panel are integrally molded with one another and are principally of open lattice construction.

38. The cart of claim 37 wherein at least a portion of the underside of said bottom panel has a vertical cross-sectional configuration having a tapered form.

* * * * *